United States Patent [19]
de Zarauz

[11] 3,962,200
[45] June 8, 1976

[54] BULK POLYMERIZATION USING AN ORGANOSILOXANE ANTI-FOAM COMPOUND

[75] Inventor: Yves de Zarauz, Gergovie-le-Cendre, France

[73] Assignee: Compagnie Generale des Etablissements Michelin, raison sociale Michelin & Cie, Cedex, France

[22] Filed: Jan. 31, 1975

[21] Appl. No.: 546,136

[30] Foreign Application Priority Data
Feb. 5, 1974  France............................. 74.03892

[52] U.S. Cl..................................... 526/78; 526/88; 526/194; 526/335; 526/347
[51] Int. Cl.².............. C08F 236/04; C08F 279/00; C08F 4/00
[58] Field of Search......... 260/94.3, 94.2 R, 88.2 C, 260/84.1, 82.1, 88.2 E

[56] References Cited
UNITED STATES PATENTS

| | | | |
|---|---|---|---|
| 2,977,349 | 3/1961 | Brockway........................... | 260/94.3 |
| 3,062,796 | 11/1962 | Greene et al........................ | 260/94.3 |
| 3,182,050 | 10/1962 | Irvin.................................... | 260/94.3 |
| 3,227,702 | 1/1966 | Small et al.......................... | 260/94.3 |
| 3,560,473 | 2/1971 | Bonfardeci et al................. | 260/94.3 |
| 3,635,852 | 1/1972 | Finestone et al................... | 260/88.2 C |
| 3,770,710 | 11/1973 | Futamura et al................... | 260/94.3 |

*Primary Examiner*—Joseph L. Schofer
*Assistant Examiner*—Herbert J. Lilling
*Attorney, Agent, or Firm*—Brumbaugh, Graves, Donohue & Raymond

[57] ABSTRACT

The deleterious foam encountered during the bulk polymerization of diene monomers with each other or with vinyl aromatic compounds can be prevented by conducting the bulk polymerization in the presence of an organosiloxane anti-foam compound, which compound does not adversely affect either the coordination catalyst system or the properties of the polymer product.

11 Claims, No Drawings

BULK POLYMERIZATION USING AN ORGANOSILOXANE ANTI-FOAM COMPOUND

The present invention relates to the homo- and co-polymerization of dienes. More particularly, it concerns improvements in the processes for the solvent-free homo-polymerization and copolymerization of dienes with each other or with vinyl aromatic compounds (these processes being hereinafter referred to by the generic expression bulk polymerization) under the action of so-called coordination catalysts, in particular in order to obtain synthetic elastomers.

It is well known that dienes polymerize and copolymerize with each other or with vinyl aromatic compounds in the absence of solvents, particularly under the action of so-called coordination catalysts. However, although it is of definite economic interest, bulk polymerization has not been used on an industrial scale due to the difficulties encountered in controlling the evolution of the reaction.

One of the main difficulties resides in the precise control of the temperature under which the polymerization takes place. As is known, this temperature is an essential factor which affects the quality of the synthetic elastomer obtained.

Thus it has been proposed to use reactors in which the temperature was controlled by means of a cooling source outside the reactor. In such reactors it is necessary, on the one hand, to assure a homogeneous distribution of the temperature throughout the entire reaction medium. On the other hand, as the thermal energy per unit of volume produced is definitely greater than in a polymerization carried out in a solvent, it is advisable to remove this energy rapidly. The result is that such reactors are difficult to design, are expensive and are difficult to operate. Bulk polymerization in such reactors is, therefore, not of appreciable economic advantage as compared to polymerization in an inert solvent carried out in the customary reactors, they being more reliable and easier to control.

Instead of using a cooling source outside the reactor, it has also been proposed to utilize the heat of evaporation of the monomer employed in the reaction in order to obtain both a fast and a homogeneous cooling of the reaction medium. However, this manner of procedure entails a certain number of drawbacks which have up to now excluded it from industrial use. These drawbacks have as their common cause the necessity, in industrial operation, of passing through ranges of concentration and temperature (and therefore of pressure) in which uncontrollable foams are formed. These foams, formed of bubbles of polymer containing the monomer in gaseous state, overrun the reactor as well as the conduits and discharge valves which they clog. This has various consequences. First of all, the foams cause an uncontrollable running away of the temperature of the reaction which is particularly disturbing in the case of large reaction masses and leads in all cases to the production of polymer having undesirable properties. Secondly, the foams substantially prevent the reintroduction into the reactor of the monomer condensed after evaporation and therefore the optimal use of the capacity of the reactor. Furthermore, it is not possible at the end of the reaction to evaporate the unconverted residual monomer from the mass of the polymer.

The object of the present invention is to obviate the drawbacks of the known bulk polymerization processes by a means which is not only effective against the foams in question in the range of pressures and temperatures employed industrially but also is without any adverse action either on the catalytic system or on the properties of the polymer resulting from the reaction.

Thus the process of the invention concerns the homo- or copolymerization of diene monomers with each other or with vinyl aromatic compounds by means of a coordination catalyst system, in the absence of solvent and using the heat of evaporation of the monomers to control the temperature of the reaction medium. This process is characterized by adding to the reaction medium, at the latest at the time of the formation of the foam, one or more anti-foam compounds selected from the group of the organosiloxanes containing in their main chain at least one recurrent unit of the general formula

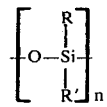

R, R' being alkyl, aralkyl, aryl, haloalkyl, haloaryl or polyhaloalkyl radicals, and $n$ being a whole number.

Typical organosiloxanes which can be used in the process of the invention include polydimethylsiloxane, polymethylphenylsiloxane, polymethylchlorophenylsiloxane, polymonomethylsiloxane, polydiethylsiloxane, polydiphenylsiloxane, polydibenzylsiloxane, polychloromethylsiloxane, polydichloromethylsiloxane, and the like.

By polymerization with coordination catalysts there is understood polymerizations which employ combinations of complexes having a base of transition metals as initiators. These combinations may comprise several components. A first component may be formed of a compound of a transition metal of Groups IIIb to VIII — halide, oxyhalide, alcoholate, amide, carbonylate, acetylacetonate or other chelate.

A second component may comprise one or more organometallic compounds of Groups Ia, IIa and/or IIIa, primarily in the form of hydride, haloalkoyl, alkoyl, or aryl. These combinations may possibly have a third component. It may consist of one or more additives, primarily electron donors or acceptors (Lewis acids or bases as the case may be) which make it possible to affect the activity and/or the stereospecificity of the catalyst system.

However, these catalyst combinations may also be of the monometallic type. There are concerned primarily derivatives of the type $R_p - M_T$ or $R_{p-q} - M_T - X_q'$ in which $M_T$ is a transition metal of valence $p$, R the so-called stabilizing group of the metal bond, primarily an allyl or benzyl group, and X an organic or inorganic ion of opposite charge such as a carboxylate or a halide of a valence $q$ such that $(p-q) + q$ is equal to the valence $p$ of the metal $M_T$.

By way of nonlimitative examples, the best known coordination catalyst combinations are:
  titanium halide / trialkyl aluminum or polyimino alane;
  titanium halide / trialkyl aluminum or polyimino alane / aromatic ether;
  titanium tetrachloride / trialkyl aluminum or polyimino alane / dialkylaluminum iodide;
  derivative of cobalt and/or nickel / alkylaluminum halide with or without Lewis acid;

derivative of nickel / fluorinated derivative of boron / trialkyl aluminum.

One can note the industrial importance of the process of the invention, in particular with catalyst systems which make it possible to affect the stereospecificity of the product obtained.

The process of the invention is advantageously used in tank reactors provided with an agitator, a device intended rapidly to degasify the monomers so as to maintain the desired temperature of the reaction medium and a device for the removal of the polymer from the reactor at the end of the reaction. The internal volume of the reactor is preferably occupied to the extent of about 50 percent by the reacting compounds. This permits a precise control of the temperature of the boiling monomer or monomers.

Due to the low inertia of the process, the temperature is easily maintained at the desired value with differences of at most ½°C. in absolute value. The process of the invention makes it possible to obtain the desired rate of conversion of the monomer or monomers, since in the case of a partial conversion it is sufficient to continue the evaporation of the unreacted monomer or monomers until they are exhausted in order to obtain a pure product. As a result the process of the invention avoids any pollution of the surrounding atmosphere.

Furthermore, the anti-foam compounds used in the process of the invention make it possible to produce polymers having properties equivalent to those of the polymers customarily obtained in solution in solvents. This is true because said compounds, although used in amount sufficient to prevent the formation of foams, are actually inactive both with respect to the catalyst systems and with respect to the monomers employed. It is even astonishing that the said anti-foam compounds of the polyorganosiloxane family do not react with components of the catalyst systems. Thus, contrary to what might be predicted from the known reactions between the organosiloxanes and for instance the alkylaluminums, no substantial change of the alkylaluminum present in reaction is noted under the conditions in which the polymerization reaction is carried out. The said organosiloxane anti-foam compounds are used in a proportion of 0.01 to 30 per thousand by weight of monomer to be polymerized and preferably in a proportion of 0.1 to 5 per thousand. For this purpose, the said liquid or solid compounds may be placed in solution or in the form of a fine dispersion in the monomer before the latter is introduced into the reactor. These compounds may also be injected during the polymerization in the form of solutions or dispersions in the reactor, preferably on the liquid-vapor boundary surface. However, the said compounds may be partly incorporated in the monomer while the balance is dispersed on the surface of the evaporating monomer. However, the optimum yield referred to the quantity of anti-foam compounds used is obtained if the said compounds, shortly before the critical moment of formation of the foams, is sprayed onto the surface of the reacting mass. In this case, the quantity of said compounds sprayed can be reduced in the proportion of about 1/5 as compared with the quantity necessary when the said compounds are incorporated in the monomer.

The following examples describe the carrying out of the invention by way of illustration and not of limitation, for various monomers and different coordination catalyst systems.

EXAMPLE 1

This example is intended to illustrate two aspects of the invention. On the one hand, this example, starting from the same initial components, shows the smooth evolution of a bulk polymerization in accordance with the process of the invention and that of a bulk polymerization in accordance with a known process.

1A. A reactor is used which comprises essentially the following subsidiary devices:
 a device for agitating the reacting medium
 a device for evacuating the gaseous monomer, making it possible to check the amount evacuated from the reactor so as to carry the reaction out under a given thermal state,
 a device for reintroducing into the reactor in the form of liquid condensate the exact mass of monomer which evaporates continuously from the reaction medium.

After having placed these devices in operation, there are introduced in succession into the reactor:
 65 kg of pure butadiene
 33 g of polydimethylsiloxane having a viscosity of 5000 centistokes
 72 g of triisobutylaluminum
 81 g of diethylaluminum iodide and
 29 g of titanium tetrachloride.

As a result of the extraction device, the absolute pressure of the evaporating butadiene is maintained constant at 1.4 bar as long as the polymerization lasts. This extraction device can be used to lower or increase as desired the pressure of the evaporating butadiene and therefore the temperature of the reaction; at no time is there noted the formation of foams on the free surface of the reacting mass. This surface rather remains undisturbed.

The reaction is carried out under a gaseous pressure of 1.4 bar absolute for 75 minutes. 120 g of methanol are then introduced into the reactor to interrupt the polymerization, followed by 125 g of an antioxidant, N-isopropyl-N'-phenyl-paraphenylene diamine.

By means of the evacuation device, 45 kg of polybutadiene are extracted from the reactor having a Mooney plasticity (1 + 3, 100°C.) of 48 and a microstructure of 92% cis-1,4 linkages, this after having eliminated 20.2 kg of unconverted butadiene by evaporation.

The rate of conversion is therefore at about 69% referred to the amount of monomer initially introduced into the reactor.

1B. The same test is carried out again. The reactor, which is provided with a porthole for the observation of the surface of the reacting mass, furthermore comprises a spray device. Differing from the preceding test, the polydimethylsiloxane is not introduced initially into the reactor. On the contrary, it is kept ready to be dispersed by the aforementioned spray device. The other components of the reaction are introduced into the reactor in the same order as previously.

Four minutes after the addition of the titanium tetrachloride there can be noted through the porthole the rapid formation and rising of foams which overrun the reactor, making it necessary to stop the reaction by injecting methanol.

The same test is then repeated. At the end of four minutes the formation of foam is observed and the polydimethylsiloxane kept on reserve is dispersed by the spray device. The foam immediately drops and the reaction continues normally without the foams reappearing before the polymerization is brought to completion.

Examples 2 to 6 below are intended to show the operation of the invention with other coordination catalyst systems in the case of a homopolymerization. The reactor used, on the other hand, is again the same.

EXAMPLE 2

A certain amount of a preformed catalyst is prepared in a separate reactor, at a temperature of 20°C.

For this purpose there are reacted:
4.75 moles of diethyl aluminum sesquichloride;
0.0475 mole of cobalt in the form of cobalt resinate;
450 cc of butadiene;
4500 cc of solvent, for instance, toluene.

There are introduced into the reactor intended for the polymerization:
68 kg of pure butadiene
195 g of polydimethylsiloxane of a viscosity of 30,000 centistokes and the quantity, as prepared above, of the live catalyst.

The reaction is carried out under an absolute pressure of 1.3 bar. At the end of 5 minutes, the reaction is stopped and 125 g of an antioxidant, N-isopropyl-N'-phenyl-paraphenylene diamine are added.

After the unreacted monomer has been evaporated, 24.5 kg of polybutadiene are extracted from the reactor, having an inherent viscosity equal to 0.90, which corresponds to a rate of conversion of 36 percent. The microstructure of the polybutadiene comprises 88 percent linkages of the cis-1,4 type and 9 percent linkages of 1,2 type.

EXAMPLE 3

Into the same reactor as described in Example 1 there are introduced:
62 kg of pure butadiene,
18 g of polydimethylsiloxane of a viscosity of 2,500,000 centistokes dissolved in 500 cc of butadiene,
8.25 moles of triethylaluminum and
2.72 moles of n-butyl titanate.

The reaction is carried out under an absolute pressure of 3.4 bars.

At the end of 75 minutes, the reaction is stopped and the polymerization completed as previously.

The rate of conversion is about 10 percent, that is to say 6.5 kg of polybutadiene containing 43 percent linkages of the 1-2 type are collected after evaporation of the unconverted butadiene.

EXAMPLE 4

Into the same reactor as described in Example 1 there are introduced:
62 kg of pure butadiene,
80 g of polydimethylsiloxane having a viscosity of 30,000 centistokes,
0.86 mole of triethylaluminum,
0.172 mole of a $BF_3$ phenol complex ($BF_3 2 C_6H_5OH$) and
0.86 mole of nickel naphthenate.

The reaction is carried out under an absolute pressure of 2.8 bars and lasts 30 minutes. It is stopped and the polymerization completed as previously and after evaporation of the unconverted monomer there are removed from the reactor 56 kg of polybutadiene having an inherent viscosity of 2.26, corresponding to a conversion rate of 90 percent and containing 96.1 percent linkages of cis-1,4 structure.

EXAMPLE 5

Into the same reactor as described in Example 1 there are introduced:
60 kg of pure isoprene,
0.680 mole of triisobutylaluminum, and
0.755 mole of titanium tetrachloride.

The reaction takes place under an absolute pressure of 1.25 bar. The starting of the polymerization can be noted from the arrival of monomer vapor into the extraction device. Shortly before the customary appearance of the foams, that is to say 2 minutes after the start of the reaction, a solution of 35 g of polydimethylsiloxane in pure isoprene is injected. As a result the reaction can be carried out to completion without incident. At the end of 90 minutes, 21 kg of polyisoprene are extracted, corresponding to a rate of conversion of 35 percent. The inherent viscosity of the polyisoprene thus produced is 2.15.

EXAMPLE 6

Into the same reactor as described in Example 1 there are introduced:
65 kg of isoprene
30 g of polydimethylsiloxane,
as well as an amount of a catalyst "preformed" 20 hours before its use, by reacting:
210 g of titanium tetrachloride,
182 g of triisobutylaluminum and
540 g of diphenyl oxide
in 3000 cc of pentane and 300 cc of isoprene.

The polymerization is carried out under a pressure of 1.25 bar absolute for 40 minutes. 23.4 kg of polyisoprene are obtained, corresponding to a rate of conversion of 36 percent.

The following Examples 7 and 8 show the use of the invention for the carrying out of copolymerizations.

EXAMPLE 7

The same reactor is used as described in Example 1 to effect a copolymerization of an isoprene-butadiene mixture comprising 50% by weight isoprene.

There are introduced into this reactor:
60 kg of the above butadiene-isoprene mixture,
90 g of polydimethylsiloxane, and then a quantity of a catalyst preformed in the following manner:
At 20°C. there are mixed together:
14 kg of toluene
200 g of butadiene
2.20 moles of diisobutylaluminumhydride
0.1116 mole of cerium octoate and
0.1116 mole of dichloroethylaluminum.

The mixture is brought to 50°C., held at this temperature for 3 hours, kept for 12 hours at room temperature and finally injected into the reactor.

The pressure of the reaction is adjusted to 1.7 bar absolute and the reaction continued for 25 minutes. Then after stoppage and anti-oxidation of the copolymer, 46.2 kg of butadiene-isoprene copolymer are collected, 14 kg of unconverted monomers having been evaporated.

The copolymer contains 47% isoprene units and 53% butadiene units, for the most part containing linkages of the cis-1,4 type.

EXAMPLE 8

The same reactor as described in Example 1 is used to carry out a copolymerization of a butadiene-styrene mixture. There are introduced into this reactor:
16.25 kg of styrene
49.75 kg of butadiene
then
  62 g of polydimethylsiloxane having a viscosity of 5000 centistokes,
  0.0109 mole of cobalt in the form of a cobalt salt,
  0.44 mole of methylaluminum sesquichloride.

The reaction pressure is fixed at 1.2 bar absolute and then allowed to rise gradually to 2.7 bars absolute at the end of 40 minutes polymerization. A reaction terminating agent and the antioxidant are then added. The rate of conversion of the monomers is 60 percent. The copolymer contains 15% styrene and has a cis-1,4 microstructure of the polybutadiene chains of 93 percent.

The following Examples 9 to 12 illustrate the use in the invention of other typical organosiloxanes.

EXAMPLE 9

The reaction is carried out again in the manner indicated in Example 4 but the polydimethylsiloxane of a viscosity equal to 30,000 centistokes is now replaced by 100 grams of a polymethylphenylsiloxane of the general formula

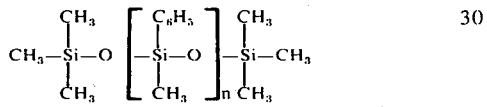

having a viscosity of 25,000 centistokes.

The reaction takes place in comparable manner and the polymer extracted from the reactor has the same characteristics as that obtained in Example 4.

EXAMPLE 10

The reaction is carried out again in the same manner as indicated in Example 4, but the polydimethylsiloxane of a viscosity of 30,000 centistokes is now replaced by 90 grams of a polymethylchlorophenylsiloxane of the general formula:

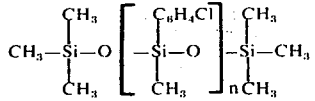

having a viscosity of 30,000 centistokes. The reaction takes place in comparable manner and the polymer removed from the reactor has the same characteristics as that obtained in Example 4.

EXAMPLE 11

The reaction is carried out again in the manner indicated in Example 4, but the polydimethylsiloxane of a viscosity of 30,000 centistokes is now replaced by 70 grams of a polymonomethylsiloxane of the general formula:

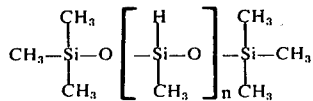

having a viscosity of 20,000 centistokes.

The reaction takes place in comparable manner and the polymer removed from the reactor has the same characteristics as that obtained in Example 4.

EXAMPLE 12

The reaction is carried out again in the manner indicated in Example 4 but the polydimethylsiloxane is now replaced by a mixture of 40 g of polydimethylsiloxane and 55 g of polymethylphenylsiloxane.

The reaction takes place in comparable manner and the polymer removed from the reactor has the same characteristics as that obtained in Example 4.

What is claimed is:

1. In the process for the homo- or co-polymerization of diene monomers with each other or with vinyl aromatic compounds by means of a coordination catalyst system comprising combinations of complexes having a base of transition metals as initiators, in the absence of solvent and using the heat of evaporation of the monomer or monomers to control the temperature of the reaction medium, the improvement which comprises adding to the reaction medium, at the latest at the time of the formation of the foam, a proportion of 0.01 to 30 per thousand, by weight of the monomer, of one or more anti-foam compounds selected from the group of the organosiloxanes containing in their main chain at least one recurrent unit of the general formula

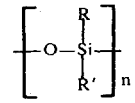

R, R' being alkyl, aralkyl, aryl, haloalkyl, haloaryl or polyhaloalkyl radicals, and $n$ being a whole number.

2. The process according to claim 1 wherein the organosiloxane is polydimethylsiloxane.

3. The process according to claim 1 wherein the organosiloxane is polymethylphenylsiloxane.

4. The process according to claim 1 wherein the organosiloxane is polymethylchlorophenylsiloxane.

5. The process according to claim 1 wherein the organosiloxane is polymonomethylsiloxane.

6. The process according to claim 1 wherein the polymerization is carried out in a tank reactor provided with an agitator, a degasification device and a device for extracting the polymer.

7. The process according to claim 6 wherein the reaction mass occupies about 50 percent of the volume of the reactor.

8. The process according to claim 1 wherein the temperature of the reaction medium is maintained with differences of at most ½°C. in absolute value.

9. The process according to claim 1 wherein the organosiloxane is used in a proportion of 0.1 to 5 per thousand, by weight of the monomer, said organosiloxane being dissolved or dispersed in the monomer.

10. The process according to claim 9 wherein the organosiloxane is sprayed on the surface of the reaction medium at the time of the formation of the foam.

11. The process according to claim 1 wherein in the case of a partial conversion of the monomer or monomers used, a pure polymer or copolymer is obtained by continuing the evaporation of the unreacted monomer or monomers until they are exhausted.

* * * * *